(12) United States Patent
Etches et al.

(10) Patent No.: US 10,393,627 B2
(45) Date of Patent: Aug. 27, 2019

(54) CHOCK ASSEMBLY

(71) Applicant: Ford Motor Company, Dearborn, MI (US)

(72) Inventors: Mickey Kevin Etches, Barking (GB); Doug Blair, Canvey Island (GB)

(73) Assignee: Ford Motor Company, Dearborn, MI (US)

( * ) Notice: Subject to any disclaimer, the term of this patent is extended or adjusted under 35 U.S.C. 154(b) by 111 days.

(21) Appl. No.: 15/638,857

(22) Filed: Jun. 30, 2017

(65) Prior Publication Data

US 2018/0003590 A1 Jan. 4, 2018

(30) Foreign Application Priority Data

Jul. 1, 2016 (GB) .................... 1611564.4
Jun. 23, 2017 (GB) .................... 1710098.3

(51) Int. Cl.
*G01M 17/007* (2006.01)
*B60T 1/04* (2006.01)

(52) U.S. Cl.
CPC ........... *G01M 17/0074* (2013.01); *B60T 1/04* (2013.01)

(58) Field of Classification Search
CPC ................................ G01M 17/0074
USPC ....................................... 73/116.06
See application file for complete search history.

(56) References Cited

U.S. PATENT DOCUMENTS

| | | | |
|---|---|---|---|
| 2,661,817 A | 12/1953 | Mullins et al. | |
| 3,695,394 A * | 10/1972 | Carpenter | B60T 3/00 188/32 |
| 4,527,416 A | 7/1985 | Haeg et al. | |
| 4,679,974 A | 7/1987 | Blunden | |
| 5,096,021 A * | 3/1992 | Tart | B65G 69/005 188/151 A |
| 5,173,018 A * | 12/1992 | Kissel | B61D 3/188 188/32 |
| 5,934,857 A * | 8/1999 | Alexander | B65G 69/005 414/401 |
| 6,050,137 A * | 4/2000 | Merrill, Sr. | G01M 17/0074 73/146 |
| 6,082,952 A * | 7/2000 | Alexander | B65G 69/005 188/32 |
| 6,290,029 B1 * | 9/2001 | Gubler | B60T 3/00 188/36 |
| 6,530,729 B2 * | 3/2003 | Tatina | B60P 3/075 248/499 |

(Continued)

FOREIGN PATENT DOCUMENTS

EP 2404795 1/2012
GB 916605 1/1963
(Continued)

OTHER PUBLICATIONS

Translation of GB-916605-A (Year: 1963).*
IPO Search Report for GB16115644, dated Dec. 13, 2016.

*Primary Examiner* — Nathaniel T Woodward
(74) *Attorney, Agent, or Firm* — Burris Law, PLLC

(57) ABSTRACT

A chock assembly for a vehicle test rig includes a guide member, a chock, and a securing member. The chock is coupled to the guide member, and the securing member is configured to secure the guide member to the vehicle test rig. The guide member is movably coupled to the securing member.

19 Claims, 3 Drawing Sheets

(56) References Cited

U.S. PATENT DOCUMENTS

| | | | |
|---|---|---|---|
| 6,957,722 B1* | 10/2005 | Baskerville, Sr. | B60T 3/00 188/32 |
| 2010/0170754 A1* | 7/2010 | Brooks | B60T 3/00 188/32 |
| 2011/0162916 A1* | 7/2011 | Saliger | B60T 3/00 188/32 |
| 2012/0118680 A1* | 5/2012 | Giglio | B60T 3/00 188/32 |
| 2015/0027818 A1* | 1/2015 | Bellota | B60T 3/00 188/32 |

FOREIGN PATENT DOCUMENTS

| | | | |
|---|---|---|---|
| GB | 916605 A * | 1/1963 | G01M 17/0074 |
| JP | H10267798 | 10/1998 | |
| JP | 2010210532 | 9/2010 | |
| WO | 2010007245 | 1/2010 | |

* cited by examiner

CHOCK ASSEMBLY

CROSS-REFERENCE TO RELATED APPLICATIONS

This application claims priority to and the benefit of GB 1710098.3 filed on Jun. 23, 2017 and GB 1611564.4 filed on Jul. 1, 2016. The disclosures of the above applications are incorporated herein by reference.

FIELD

The present disclosure relates to a chock assembly, and particularly, but not exclusively, relates to a chock assembly having a movable guide member.

BACKGROUND

The statements in this section merely provide background information related to the present disclosure and may not constitute prior art.

During the testing of a vehicle, it is common to use a dynamometer to measure the performance of the vehicle's drivetrain. In order to secure the driven wheels of the vehicle in place on the dynamometer, one or more chocks may be used to prevent the non-driven wheels of the vehicle from moving, thereby keeping the vehicle in position on the dynamometer.

Conventional chocks can be cumbersome to position and secure to the vehicle and the dynamometer. For example, it is common to use four individual chocks to prevent the non-driven wheels from moving during testing. Given that each chock may have a mass up to approximately 50 kg, manual handling of the chocks can be difficult.

It is common practice to reconfigure a dynamometer test rig between testing front and rear wheel drive vehicles. In particular, the chocks can block access to a test bed of the dynamometer, which makes it difficult to swap vehicles between tests. In order to reconfigure the test rig, the chocks can be moved and re-secured, which can increase the length of time taken to reconfigure the test rig.

In some circumstances, the test rig may have a tow-eye post, which can be used in addition to the chocks to help secure the vehicle to the test rig by strapping or chaining the tow eye of the vehicle to the test rig. Another issue is that the tow-eye post can reduce accessibility when moving the dynamometer and/or the vehicle around the test rig. Further, the tow-eye post may be redundant during the testing of some vehicles.

SUMMARY

In one form, the present disclosure teaches a chock assembly for a vehicle test rig. The chock assembly includes a guide member, a chock, and a securing member. The chock is coupled to a guide member, and the securing member is configured to attach the guide member to the vehicle test rig. The guide member is movably (e.g. slidably) coupled to the securing member. The guide member is operable to move along the vehicle test rig (e.g., moveable along a longitudinal centerline of the vehicle test rig) while being attached to the vehicle test rig. The guide member may be configured to guide the position of the chock, for example, relative to the securing member. The guide member may be configured to guide laterally the position of the chock relative to the securing member.

In one form, the chock may be fixed to the guide member (e.g. by virtue of a removable fastener), such that movement of the guide member relative to the securing member effects the movement of the chock.

In another form, the securing member may be removably attachable to a rail of the vehicle test rig (e.g. a rail that extends longitudinally along the vehicle test rig). The securing member may be configured to secure the guide member to the rail of the vehicle test rig, for example directly secure without one or more intermediary members. The securing member may comprise a clamp assembly configured to clamp the guide member in position relative to the vehicle test rig.

In still another form, the chock may be moveable relative to the guide member and the guide member may be moveable relative to the securing member. The chock may be provided with a releasable locking device which when locked prevents the chock moving relative to the guide member.

In one form, the guide member may be slidably coupled to the securing member. For example, the guide member may comprise a runner configured to engage an opening in the securing member. The guide member may be slidably coupled to the chock. For example, the guide member may comprise a runner configured to engage an opening in the chock. The opening of the securing member may be configured to engage the same runner as the opening of the chock. In this manner, the guide member may have only a single type of runner.

In another form, the guide member may be withdrawable away from the vehicle test rig, for example whilst the securing member is attached to the vehicle test rig. The guide member may be withdrawn in a lateral direction of the vehicle test rig, for example without altering the longitudinal position of the clamp assembly. For example, an operator of the vehicle test rig may enable the guide member and the chock to be moved laterally away from a bed of the vehicle test rig by loosening one or more fasteners that attach the securing member to the vehicle test rig. In this manner, the clamp force of the securing member imparted to the guide membered is reduced, which allows for the guide member and the chock to be withdrawn laterally away from the bed of the vehicle test rig, without changing the longitudinal position of the clamp assembly relative to the vehicle test rig. Such a setup is advantageous as it allows for the chock to be moved towards an edge of the bed of the vehicle test rig, for example without adjusting the longitudinal position of the chock assembly relative to the bed of the test rig. Indeed, the present disclosure allow for an operator of the vehicle test bed to clear the vehicle test bed from obstruction (caused by the chock and the guide member) by moving, (e.g. sliding the guide member and the chock towards a lateral edge of the vehicle test bed). By moving the guide member and the chock towards a lateral edge of the vehicle test bed (e.g. to a position laterally inboard of a side rail of the vehicle test bed), the bed of the vehicle test rig is left clear of obstruction. This is advantageous as it allows other equipment, such as a trolley, to be maneuvered without hindrance across the bed of the vehicle test rig.

In yet another form, the chock assembly allows the bed of the vehicle test rig to be cleared of obstruction without an operator lifting the guide member and/or the chock, which can be heavy. Instead, the guide member may be simply pulled away from the test bed, once a clamp force of the securing member has been appropriately reduced.

In one form, the guide member and/or the chock may comprise at least one bearing element configured to engage the bed of the vehicle test rig. For example, the guide member and/or the chock may comprise one or more roller bearings, which allow the guide member and/or the chock to be rolled across the bed of the vehicle test rig.

In another form, the guide member may be rotationally coupled to the securing member. For example, the chock assembly may comprise a rotational coupling between the guide member and the securing member that allows the guide member to pivot away from the securing member in a horizontal direction and/or a vertical direction, when the chock assembly is attached to the test rig.

In yet another form, the chock assembly may comprise a locking element configured to lock the position of the guide member relative to the securing member. For example, the chock assembly may comprise a removable pin configured to extend at least partially though an opening in the guide member and an opening in the securing member to fix the position of the guide member relative to the securing member. When the locking member is engaged, the chock assembly may still be allowed to move relative to the test rig (i.e. the locking member may be a separate feature from one or more fasteners used to secure the securing member, and thus the chock assembly, to the test rig). The locking element may be used, at least in part, to secure the securing member to the test rig.

In one form, the guide member may be lockable relative to the securing member in a plurality of discrete positions. For example, the guide member and/or the securing member may have a plurality of separate openings, each of which is configured to engage the locking element. The locking element may be an indexable plunger.

In another form, the chock may be moveably coupled to the guide member. For example, the chock may be slidably and/or rotationally coupled to the guide member. The chock and the guide member may be a unitary component (e.g. the chock and the guide member may be fixed together during manufacture so that the chock and the guide member are unable to move relative to each other).

In yet another form, the chock assembly may comprise a support structure, for example a post, attachable to a recovery point, such as a tow eye, of a vehicle. The support structure may be configured to steady the vehicle relative to the chock assembly, for example by virtue of one or more tensioning straps and/or one or more bracing members that connect the support structure to the vehicle. The support structure may be configured to restrict the movement of the vehicle in a transverse direction, when the vehicle is chocked on the test rig.

In one form, the support structure may comprise a post having one or more attachment points. The support structure may be removably attachable to the securing member. The support structure may be removably attachable to the guide member. The support structure may be configured to function as a handle to move the guide member when the support structure is attached to the guide member.

In one form, the present disclosure teaches a chock assembly attachable to a vehicle test rig. The chock assembly comprises a support structure, for example a post, attachable to a recovery point of a vehicle. The support structure may be configured to steady the vehicle relative to the chock assembly, for example in a direction perpendicular to the radial plane of a wheel that is chocked by the chock assembly. The support structure may be connectable to a vehicle by virtue of one or more tensioning straps and/or one or more bracing members.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
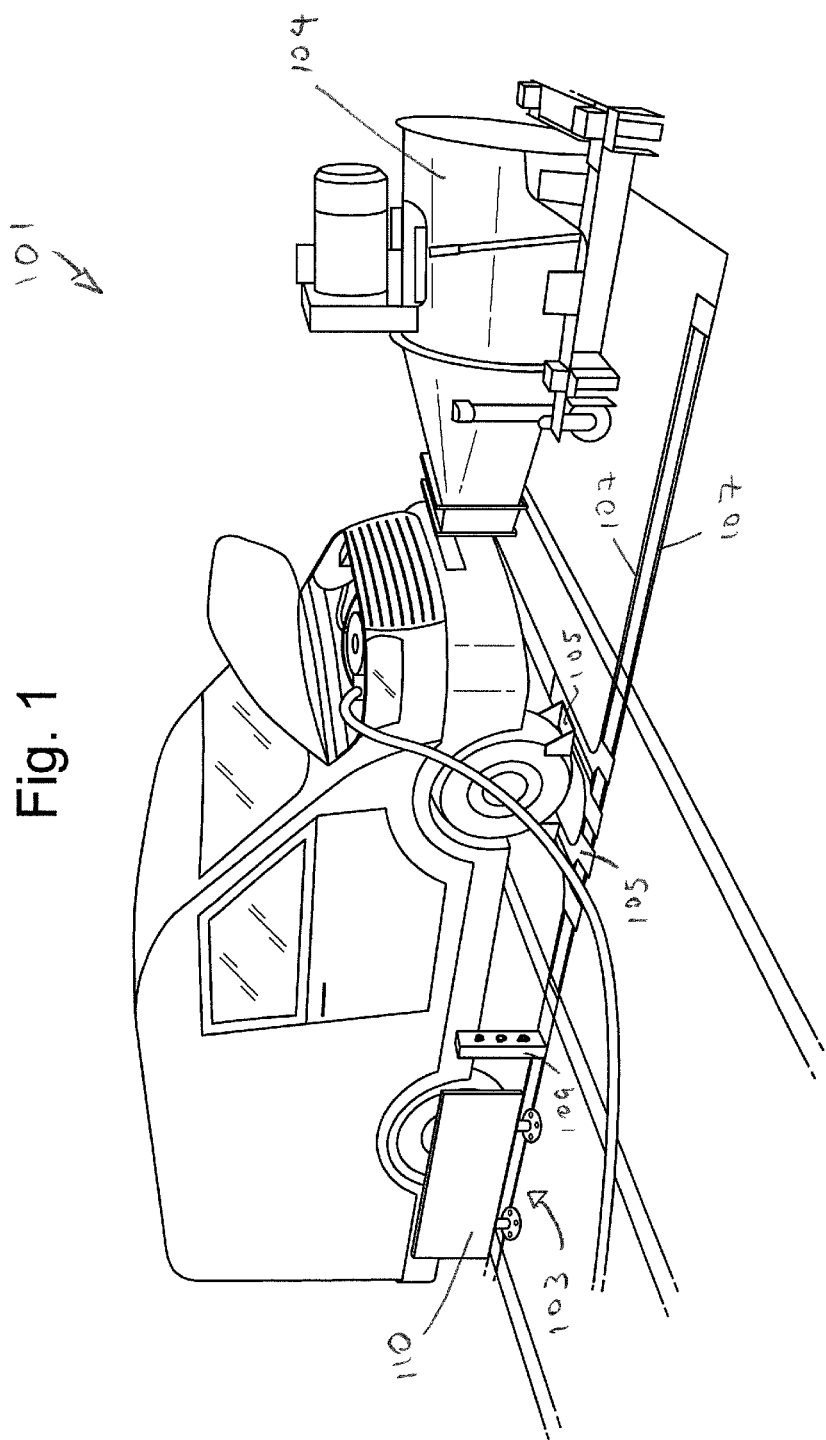
FIG. 1 illustrates a rear wheel drive vehicle on a vehicle test rig and attached by way of conventional chock assemblies.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a vehicle test rig 101 used for the testing of a vehicle, such as the testing of a vehicle's drivetrain and/or vehicle emissions testing. The vehicle test rig 101 comprises a dynamometer 103 and a blower 104 configured to blow air towards the front of the vehicle during testing. In order to prevent the vehicle from moving during testing, a plurality of conventional chock assemblies 105 are used to secure the vehicle in position on the vehicle test rig 101.

In the arrangement shown in FIG. 1, the vehicle is a rear wheel drive vehicle which is positioned on the test rig 101 such that its rear wheels are on the dynamometer 103. In order to secure the vehicle in position on the test rig 101, a plurality of conventional chock assemblies 105 are used to prevent the non-driven wheels (e.g., the front wheels) of the vehicle from moving. The chock assemblies 105 are coupled to one of a plurality of rails 107 provided to the side of the test rig 101 and extending on opposite sides of a longitudinal centerline of the test rig, so that the chock assemblies 105 can be moved forwards and backwards relative to the vehicle to accommodate vehicles having wheel bases of different lengths. While not shown in FIG. 1, both of the front wheels of the vehicle are secured using chock assemblies 105. It can be seen, therefore that four separate chock assemblies 105 are required to secure the vehicle's non-driven wheels to the test rig 101.

In another arrangement, the test rig 101 may be reconfigured to test a front wheel drive vehicle. In order to reconfigure the test rig 101, the rear wheel drive vehicle is removed from the test rig 101, the blower 104 may be repositioned and/or the position of the dynamometer 103 may be changed, such that a front wheel drive vehicle can be positioned on the test rig 101 with its front wheels on the dynamometer 103 and the blower 104 positioned proximate to the front end of the front wheel drive vehicle. In a similar manner to the rear wheel drive vehicle, the chock assemblies 105 are secured to the non-driven wheels of the front wheel drive vehicle to secure the vehicle to the test rig 101.

In order to steady the vehicle on the test rig 101, a support structure 109, such as a post, may be attached to a recovery point of a vehicle. As illustrated in FIG. 1, the support structure 109 may be attached to the rails 107, but not to the vehicle. The support structure 109 may be used to further steady the vehicle on the test rig 101, such as in scenarios where the driven wheels of the vehicle that are on the dynamometer are also the wheels configured to steer the vehicle. It is understood, however, that the support structure 109 may be used to steady any appropriate vehicle. During the testing of front wheel drive vehicle, one or more support structures 109 may be coupled to the front recovery point of the vehicle by virtue of a plurality of straps that can be tensioned between the recovery point of the vehicle and the one or more support structures 109. In another arrangement, the support structure 109 may be rigidly coupled to the recovery point of the vehicle using one or more bracing members that extend between the support structure 109 and the vehicle.

Generally, in order to reconfigure the test rig 101 between the testing of different vehicles (e.g., between the testing of front and rear wheel drive vehicles), the conventional chock assemblies 105 are removed from the test rig 101. For example, in order to move the vehicle on and off the test rig 101, a vehicle mover, such a trolley, may be used. As is shown in the test rig setup of FIG. 1, the chock assemblies 105 extend from the rail 107 and underneath the vehicle, which can prevent the vehicle mover from being positioned under the vehicle. Thus, in order to remove the vehicle from the test rig 101, the chock assemblies 105 are detached from the rails 107, and moved out of the way, which increases the length of change-over time between vehicles. Further, since each chock assembly 105 can have a mass of approximately 50 kg, it may be difficult for an operator to move the chock assemblies 105 to and/or from the test rig 101.

In a similar manner, the chock assemblies 105 may prevent the blower 104 from being moved along the test rig 101, when the chock assemblies 105 are secured to the test rig 101. Thus, in order to reposition the blower 104 at the other end of the test rig 101, the chock assemblies 105 are typically detached from the rails 107, and placed to one side of the test rig 101 to allow the blower 104 to be wheeled along the bed of the test rig 101.

A further problem is that when the chock assemblies 105 are installed on the test rig 101, the dynamometer 103 may be unable to traverse along the length of the test rig 101 since the chock assemblies 105 prevent a barrier 110, such as a gate, of the dynamometer 103 from sliding along the rails 107. As a result, the chock assemblies 105 are removed from the test rig 101 between the testing of differently configured vehicles.

Figure 2:
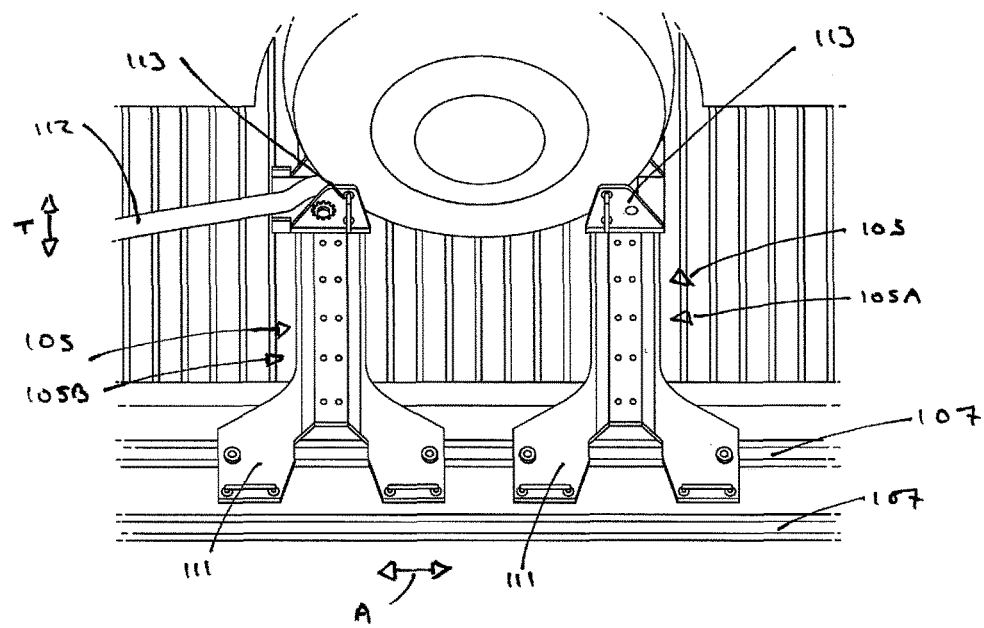
FIG. 2 illustrates a wheel chocked by the conventional chock assemblies of FIG. 1.

FIG. 2 shows a detailed view of the conventional chock assembly 105. In the setup shown in FIG. 2, a non-driven wheel of the vehicle is secured to the test rig 101 using a first chock assembly 105a and a second chock assembly 105b. Each of the chock assemblies 105a, 105b comprises a "Y" shaped guide member 111 that is secured directly to one of the rails 107, for example by virtue of one or more fasteners, such as Halfen T-bolt fasteners, so that the guide member 111 is unable to move relative to the rail 107 and/or the vehicle. The guide member 111 is moveably coupled to a chock 113 in a manner that allows the chock 113 to slide along the length of the guide member 111 in a transverse or lateral direction which is substantially perpendicular to the rail 107. In this manner, the chock 113 of the chock assembly 105 can be moved to an appropriate axial position by virtue of the interaction between the guide member 111 and the rail 107, and to an appropriate transverse position by virtue of the interaction between the chock 113 and the guide member 111. The axial displacement of the chock is along an axis indicated by arrow A, and the transverse displacement of the chock 113 is along an axis indicated by arrow T. Once the first and second chock assemblies 105a, 105b are moved to an appropriate position, the chock 113 of each chock assembly 105a, 105b can then be fixed in place relative to the guide member 111, and the guide member 111 can be fixed in place relative to the rail 107. Additionally, a tensioning strap 112 may be provided in order to tension the chocks 113 of the respective chock assemblies 105a, 105b towards each other.

Figure 3:
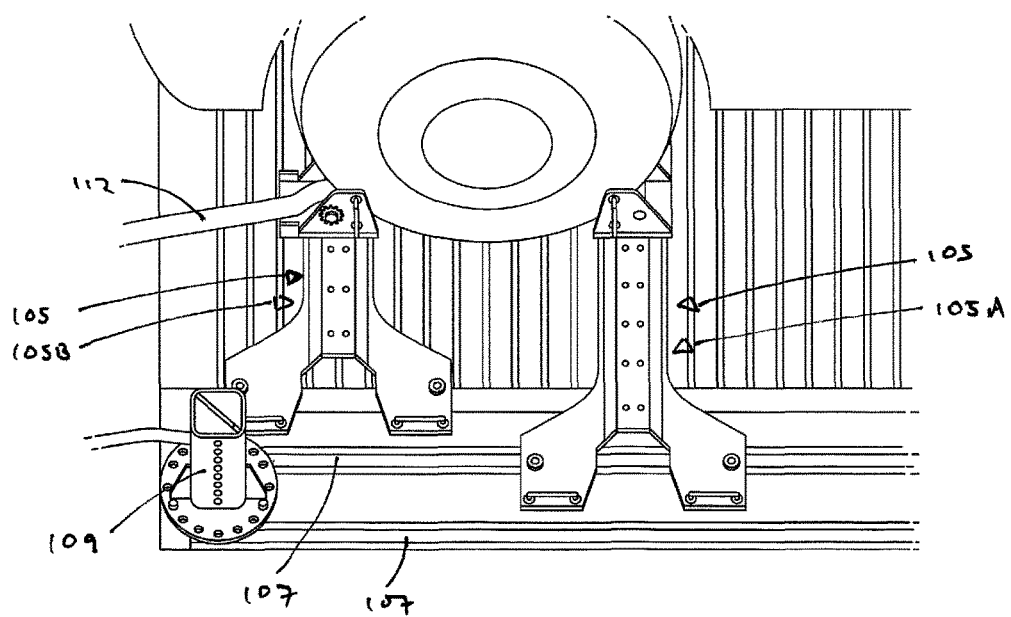
FIG. 3 illustrates the conventional chock assemblies and a conventional support structure of FIG. 1.

In the arrangement shown in FIG. 3, the first and second chock assemblies 105a, 105b, together with the support structure 109, are positioned towards a limit of travel of the rail 107, which may be required when testing a vehicle having a particularly long wheel base. The first chock assembly 105a is secured to the rail 107, but the second chock assembly 105b is unable to be secured to the rail 107 owing to the position of the support structure 109. FIG. 3 thus highlights another possible issue with the conventional chock assemblies, in that the support structure 109 may have to be removed from the test rig 101 during the testing of long wheel base vehicles, if the rails 107 do not extend suitably beyond the end of the test rig 101.

Figure 4A:
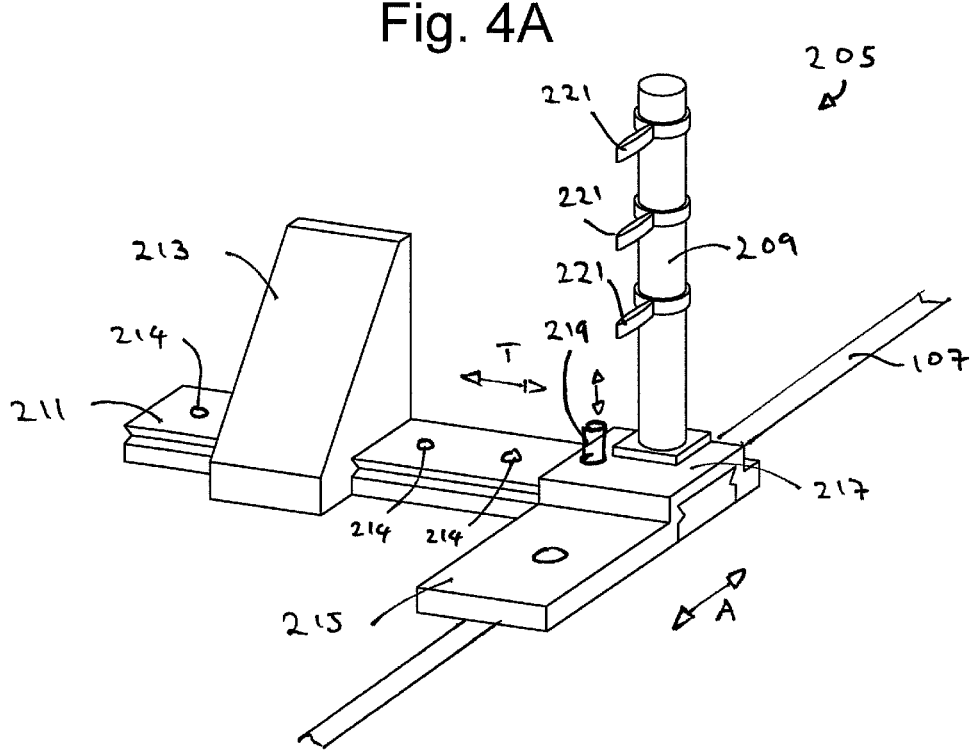
FIGS. 4A and 4B illustrate a chock assembly according to the teachings of the present disclosure.
Figure 4B:
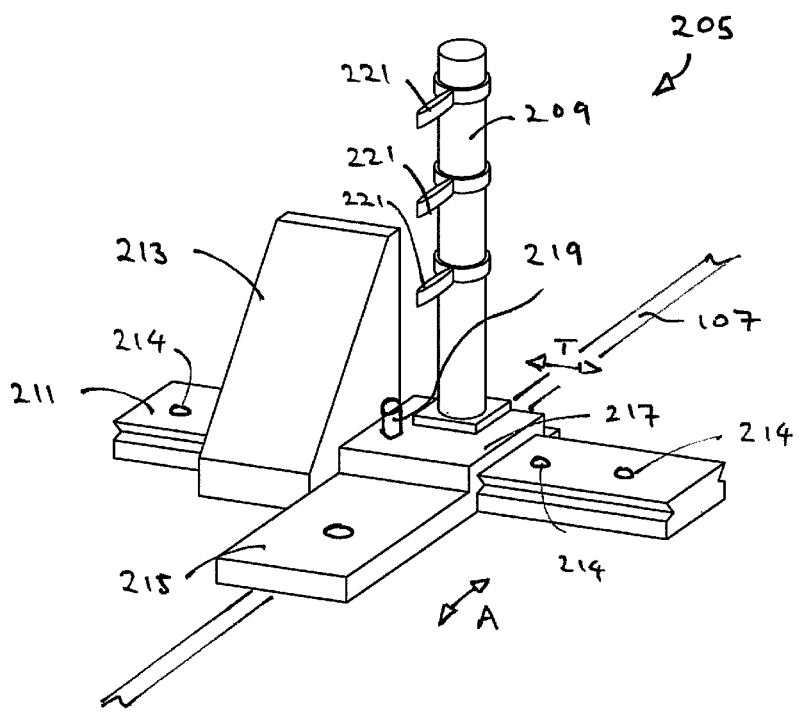

FIGS. 4A and 4B illustrate a chock assembly 205 according to teachings of the present disclosure, which can be used in the test rig 101. The chock assembly 205 comprises a chock 213, a guide member 211 and a securing member 215 (e.g. a clamp assembly 215) configured to secure the guide member 211 to the vehicle test rig 101, for example by attachment to at least one of the rails 107. The chock 213 is movably coupled to the guide member 211 such that the chock 213 can slide along the length of the guide member 211 in the transverse or lateral direction along the Axis T, when the chock assembly 205 is attached to the test rig 101. Alternatively, the guide member and the chock may be a unitary component such that the chock and the guide member may be fixed together so that the chock and the guide member are unable to move relative to each other. The clamp assembly 215 may be configured to attach the chock assembly 205 to at least one of the rails 107 of the test rig 101, so that the chock 213 can be positioned in the axial direction (arrow A in Figures). Further, the clamp assembly 215 may be configured to clamp the guide member 211 to at least one of the rails 107 so that the guide member 211 is unable to move once the clamp assembly 215 is secured in place.

In another arrangement, the chock 213 and the guide member 211 may be moveably coupled in various suitable ways. For example, the chock 213 may be rotationally coupled to the guide member 211 in addition to, or instead of, being slidably coupled as shown in FIGS. 4A and 4B.

Unlike the conventional chock assemblies 105, the chock assembly 205 according to the present disclosure has the guide member 211 that is movably coupled to the clamp assembly 215. As a result, the guide member 211 may be withdrawn along the axis T in a direction away from the longitudinal centerline of the test rig 101 while the clamp assembly 215 is attached to the rail 107.

In the arrangement shown in FIGS. 4A and 4B, the guide member 211 is slidably coupled to the clamp assembly 215 so that the guide member 211 may be withdrawn or moved away from the test rig 101 in a transverse direction, when the clamp assembly 215 is coupled to the rail 107. For example, the guide member 211 may be moved from a first position where the guide member 211 and the chock 213 are located towards the center of the test rig 101, as shown in FIG. 4A, to a second position where the guide member 211 and the chock 213 are located away from the center of the test rig 101, as shown in FIG. 4B.

The slidable connection between the guide member 211 and the clamp assembly 215 allows an operator to pull the guide member 211, together with the chock 213, out from under a vehicle that is positioned on the test rig 101, to a position adjacent the rail, so that the test rig 101 is unobstructed to have vehicles and equipment move on and off the test rig 101 with the chocks 213 still attached to the rail 107. This is beneficial as the chock assembly 205 need not be removed from the test rig 101 between the testing of vehicles. In one arrangement, in order to slide the guide member 211 away from the test rig 101, an operator may simply loosen the fasteners that attach the clamp assembly 215, and thus the chock assembly 205, to the rail 107 in order to release the force of a clamp 217 of the clamp assembly 215 on the guide member 211. The operator may then simply pull on a handle (not shown) of the guide member 211 to withdraw or move the guide member 211 away from the test rig 101.

In another arrangement, the guide member 211 may be rotationally coupled to the clamp assembly 215 in the horizontal and/or the vertical direction, so that the guide member 211 may be pivoted away from the test rig 101. It is understood, however, that the guide member 211 may be moveably coupled to the clamp assembly 215 in any appropriate manner that allows the guide member 211 to be moved away from the test rig 101 without removing the chock assembly 205 from the test rig 101. In one arrangement, movement of the guide member 211 away from the test rig 101 may also effect the removal of the chock 213 from engagement with the wheel of the vehicle. However, depending on the configuration of the chock 213, the guide member 211 may be unable to be withdrawn until the chock 213 has been disengaged from the wheel.

In the arrangement shown in FIGS. 4A and 4B, the chock assembly 205 comprises a locking element 219 configured to locate the guide member 211 relative to the clamp assembly. For example, the locking element 219 may be configured to lock the position of the guide member 211 relative to the clamp assembly 215, so that the guide member 211 is unable to move even when the clamping force of the clamp 217 is released. The locking element 219 may comprise a pin configured to engage one or more openings 214 in the guide member 211. For example, the locking element 219 may comprise an index plunger configured to lock the guide member 211 in one of a plurality of discrete positions.

Another difference between the chock assembly 205 according to the present disclosure and the conventional chock assembly 105 is that the chock assembly 205 comprises a support structure 209. This is advantageous since it reduces the number of components that need to be secured to the rails 107 of the test rig 101. In the arrangement shown in FIGS. 4A and 4B, the support structure 209 is a post having a plurality of attachment points 221 that permit the post to be coupled to the recovery point of the vehicle by virtue of one or more tensioning straps. Additionally, or alternatively, the support structure 209 may comprise one or more movable bosses, each boss being configured to hold a bracing member between the support structure 209 and the recovery point of the vehicle. In this manner, the support structure 209 is able to function in a similar manner to the separate conventional support structure 109.

In FIGS. 4A and 4B, the support structure 209 is coupled to the clamp assembly 215. However, the support structure 209 may be coupled to any appropriate portion of the chock assembly 205. In one arrangement, the support structure 209 may be removably coupled to the clamp assembly 215, for example by virtue of a taper-lock coupling, so that the support structure 209 may be removed from the chock assembly 205 when not in use. In one arrangement, the support structure 209 may be coupleable to the guide member 211 in a manner that allows the support structure 209 to be used as a handle to withdraw the guide member 211 away from the test rig 101. For example, once a test has been completed, the support structure 209 may be removed from a coupling on the clamp assembly 215, and moved to another coupling provided on the guide member 211. Once the clamp force of the clamp 217 is released from the guide member 211, the guide member 211 may be pulled back from the test rig 101 using the support structure 209 as the handle. This is advantageous as the guide member 211 need not be provided with its own dedicated handle.

Based on the teachings of the present disclosure, a chock assembly for a vehicle test rig comprises: a guide member, a chock coupled to the guide member, and a securing member configured to secure the guide member to the vehicle test rig, where the guide member is movably coupled to the securing member.

According to one form of the present disclosure, the guide member of the chock assembly slidably coupled to the securing member.

According to another form of the present disclosure, the guide member of the chock assembly is rotationally coupled to the securing member.

According to yet another form of the present disclosure, the chock assembly further comprises a locking element configured to lock the position of the guide member relative to the securing member.

According to one form of the present disclosure, the guide member is lockable relative to the securing member in a plurality of discrete positions.

According to another form of the present disclosure, the chock is moveably coupled to the guide member.

According to yet another form of the present disclosure, the chock assembly further comprises a support structure attachable to a recovery point of a vehicle.

According to one form of the present disclosure, the support structure is removably attachable to the securing member.

According to another form of the present disclosure, the support structure is removably attachable to the guide member.

According to yet another form of the present disclosure, the support structure functions as a handle to move the guide member when the support structure is attached to the guide member.

According to one form of the present disclosure, a vehicle test rig have a chock assembly according to the teachings of the present disclosure.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A chock assembly for a vehicle test rig, the chock assembly comprising:
    a guide member;
    a chock coupled to the guide member;
    a securing member configured to attach the guide member to the vehicle test rig, wherein the guide member is slidably coupled to the securing member, and the guide member is moveable along a longitudinal centerline of the vehicle test rig while being attached to the vehicle test rig; and
    a support structure configured to attach to one of the guide member and the securing member, the support structure being configured to attach the chock assembly to a recovery point of a vehicle.

2. A chock assembly according to claim 1, wherein the guide member is configured to guide a transverse displacement of the chock relative to the securing member.

3. A chock assembly according to claim 1, wherein the guide member is rotationally coupled to the securing member.

4. A chock assembly according to claim 1, wherein the securing member defines an opening, and the guide member extends through the opening of the securing member.

5. A chock assembly according to claim 1 further comprising a locking element configured to lock the guide member relative to the securing member such that the guide member is unmovable.

6. A chock assembly according to claim 1, wherein the guide member is lockable relative to the securing member at a plurality of discrete positions along the guide member.

7. A chock assembly according to claim 1, wherein the chock is moveably coupled to the guide member.

8. A chock assembly according to claim 1, wherein the chock and the guide member are a unitary component.

9. A chock assembly according to claim 1, wherein the securing member is configured to secure the guide member to a rail of the vehicle test rig.

10. A chock assembly according to claim 1, wherein the support structure is attached to the securing member.

11. A chock assembly according to claim 1, wherein the support structure is attached to the guide member.

12. A chock assembly according to claim 1, wherein the support structure is configured to move the guide member when the support structure is attached to the guide member.

13. A vehicle test rig having the chock assembly of claim 1.

14. A chock assembly for a vehicle test rig, the chock assembly comprising:
    a guide member extending along a first axis;
    a chock coupled to the guide member;
    a securing member configured to attach to a rail of the test rig, the rail extending along a second axis perpendicular to the first axis, wherein the guide member is slidably coupled to the securing member, and the guide member and the chock are moveable along the first axis; and
    a support structure configured to attach to one of the guide member and the securing member, the support structure having at least one attachment point configured to attach the chock assembly to a vehicle in the test rig.

15. A chock assembly according to claim 14, wherein the chock is fixedly attached to the guide member.

16. A chock assembly according to claim 14, wherein the chock is moveable along the guide member.

17. A chock assembly according to claim 14, wherein a position of the chock along the second axis is controlled by the securing member.

18. A chock assembly according to claim 14 further comprising a locking element operable to lock the guide member relative to the securing member such that a position of the guide member along the first axis is fixed.

19. A chock assembly according to claim 14, wherein the support structure has a plurality of attachment points configured to interface with the vehicle in the test rig.

* * * * *